United States Patent [19]
Stoll et al.

[11] Patent Number: 5,367,943
[45] Date of Patent: Nov. 29, 1994

[54] ROTARY-LINEAR UNIT

[75] Inventors: Kurt Stoll, Esslingen; Albrecht Wagner, Winterbach, both of Germany

[73] Assignee: Festo KG, Esslingen, Germany

[21] Appl. No.: 115,229

[22] Filed: Sep. 1, 1993

[30] Foreign Application Priority Data

Sep. 8, 1992 [DE] Germany ............................. 4229989

[51] Int. Cl.⁵ ............................................. F01B 21/00
[52] U.S. Cl. ............................................. 92/2; 91/61
[58] Field of Search ..................... 92/2, 121, 125; 91/61

[56] References Cited

U.S. PATENT DOCUMENTS

| | | | |
|---|---|---|---|
| 3,082,741 | 3/1963 | Huffman | 91/61 |
| 3,620,132 | 11/1971 | Nitkiewicz | 92/2 |
| 3,766,831 | 10/1973 | Yeakley | 91/61 |
| 3,815,479 | 6/1974 | Thompson | 92/2 |
| 4,169,404 | 10/1979 | Tsuchihashi | 91/61 |

FOREIGN PATENT DOCUMENTS

| | | | |
|---|---|---|---|
| 1153254 | 8/1963 | Germany | 92/2 |
| 3212636 | 10/1983 | Germany | 92/2 |
| 3247159 | 6/1994 | Germany . | |
| 0646203 | 9/1962 | Italy | 91/61 |
| 0200707 | 12/1982 | Japan | 92/2 |
| 0170955 | 10/1983 | Japan | 92/2 |
| 1366628 | 9/1974 | United Kingdom | 92/125 |
| 2068463 | 8/1981 | United Kingdom | 92/2 |

*Primary Examiner*—Thomas E. Denion
*Attorney, Agent, or Firm*—Hoffman & Baron

[57] ABSTRACT

A rotary-linear unit from whose front end the operative section of a output drive part projects. This output drive part is drivingly connected both with a linear drive and with an oscillating vane motor. The oscillating vane motor is associated with the rear end of the rotary-linear unit, the linear drive being arranged between the oscillating vane motor and the operative section of the output drive rod. This leads to an assembly which is extremely compact both in the axial direction and also in the radial direction.

17 Claims, 2 Drawing Sheets

ROTARY-LINEAR UNIT

BACKGROUND OF THE INVENTION

The invention relates to a rotary-linear unit, on whose front end there projects the operative drive section of an output drive part able to be driven by means of a rotary drive and a linear drive for both a rotary motion about its longitudinal axis and also for a linear stroke motion in the direction of its longitudinal axis, the rotary drive and the linear drive being arranged in sequence along the longitudinal axis of the output drive part.

In the case of such a known rotary-linear unit the rotary drive is arranged in the part axially between the operative section of the output drive part and the linear drive. The output drive part is designed in the form of a rod and is mounted on a piston, which is reciprocatingly received in the linear drive for fluid power operation. Starting at the piston the output drive part extends through the rotary drive in order to extend at its other end section, which constitutes the operative section, from the rotary drive at the end opposite to the linear drive. The rotary drive furthermore possesses a fluid operated linearly driven piston, which is connected with the output drive part in such a fashion as to prevent relative twist while being to be slid axially thereon. Additionally such piston is connected with the aid of a sliding guide with the surrounding housing. When there is an axial motion of the piston of the rotary drive a rotary movement is imparted to the output drive part. The additional linear stroke movement imposed is rendered possible by actuation of the piston of the linear drive.

Although in the case of such a rotary-linear unit the output drive part is relatively well supported in a direction perpendicular to its longitudinal direction, there is however the disadvantage of a comparatively large overall axial length. Although furthermore there has been a proposal to design the rotary drive in the form of a rack mechanism leading to a reduction in the axial dimensions, in such a case the transverse dimensions are substantially increased, since the housing containing the rack extends at a right angle to the longitudinal axis of the output drive part. In both cases it is consequently necessary to make more space available at the position where the unit is to be mounted.

SHORT SUMMARY OF THE INVENTION

One object of the invention is to provide a rotary-linear unit of the type initially mentioned which while still having compact radial dimensions and while being able to be readily serviced, renders possible a reduction in the overall axial size.

In order to attain this and/or other objects appearing herein, in the invention the rotary drive is associated with the rear end of the unit, the linear drive being arranged axially between the rotary drive and the operative section of the output drive part and furthermore the rotary drive is constituted by a fluid power operated oscillating vane motor.

Therefore in this case as the rotary drive integrated in the rotary-linear unit use is made of an oscillating vane motor, as is described in, for instance, the German patent publication 3,941,255 A1. Such a rotary drive has an extremely compact design with small dimensions both in the axial and also in the radial direction. Furthermore, complex mechanical devices are unnecessary in order to transmit the rotary motion to the output drive part. The output drive shaft of the oscillating vane motor may be directly connected with the output drive part. In connection with this it is an advantage that the oscillating vane motor is associated with the rear side of the rotary-linear unit. In the case of such an oscillating vane motor it is furthermore an extremely simple matter to perform adjustment of the respectively desired angular setting without having to exchange components. A possible modification of the value set for the angular position is possible at any time without any danger, since the oscillating vane motor is arranged on the side of the linear drive remote from the output drive part.

Further advantageous forms of the invention are recited in the claims.

It is convenient if the output drive part extends axially through the linear drive and if a rotary drive section, opposite to the operative section, thereof is accommodated in a bearing recess, which is provided in the centrally arranged output drive shaft of the oscillating vane motor. Thus in this manner the output drive part is coupled with the output drive shaft in such a fashion as to prevent relative twist and simultaneously makes possible an axially directed stroke while being reliably supported in the transverse direction. The result is then an optimum bearing system for the output drive part, at little expense, on the end opposite to the operative section.

It is furthermore an advantage if the output drive shaft of the oscillating vane motor is designed in the form of a tubular shaft, whose continuous bore constitutes the bearing recess. In this case the output drive shaft is accessible from the rear end or side of the rotary-linear unit, something is which more especially an advantage if the output drive part possesses an axial opening through it. It is consequently possible to supply any instrumentality provided on the operative and, as for example a manipulator, via the piston rod opening with power as is required for the operation thereof. It is possible to utilize the continuous piston opening as, for instance, a power fluid or vacuum duct or for the laying of control cables.

It is convenient for the output drive part to be mounted for linear sliding and also for rotary movement in the passageway through the front housing, remote from the oscillating vane motor, of the linear drive. Thus in this manner there is a reliable supporting action for the output drive part at two relatively far apart positions, something which entails a reliable, non-skew running manner of operation of the linear drive motor.

The linear motor is preferably fluid power operated, the output drive part comprising a piston arranged in the housing to separate the same into two housing space, which piston is able to be acted upon by power fluid on either side thereof. It is convenient furthermore if the piston is mounted on an integral output drive rod, which at one end extends out of the linear drive with the formation of the operative section and at the other end projects into the oscillating vane motor with the formation of the rotary drive section or even extends right through the same.

Preferably the connection means for the supply of fluid to both the linear drive and also the oscillating vane motor are provided at some central point on the rotary-linear unit, same being preferably arranged in the part between the linear drive and the rotary drive.

On the axial end remote from the linear drive of the oscillating vane motor it is convenient to provide an angular adjustment setting means, which operates outside the vane chamber between the housing of the oscillating vane motor and its output drive shaft. This means that it is possible to perform a reliable adjustment of the angular setting without any danger of damage to the oscillating vane. Such adjustment is free of danger, since it is performed at a position well clear of the operative section of the output drive part.

The invention is be described in following in more detail with reference to the accompanying drawing.

LIST OF THE SEVERAL VIEWS OF THE FIGURES

DETAILED ACCOUNT OF WORKING EMBODIMENTS OF THE INVENTION

Figure 1:
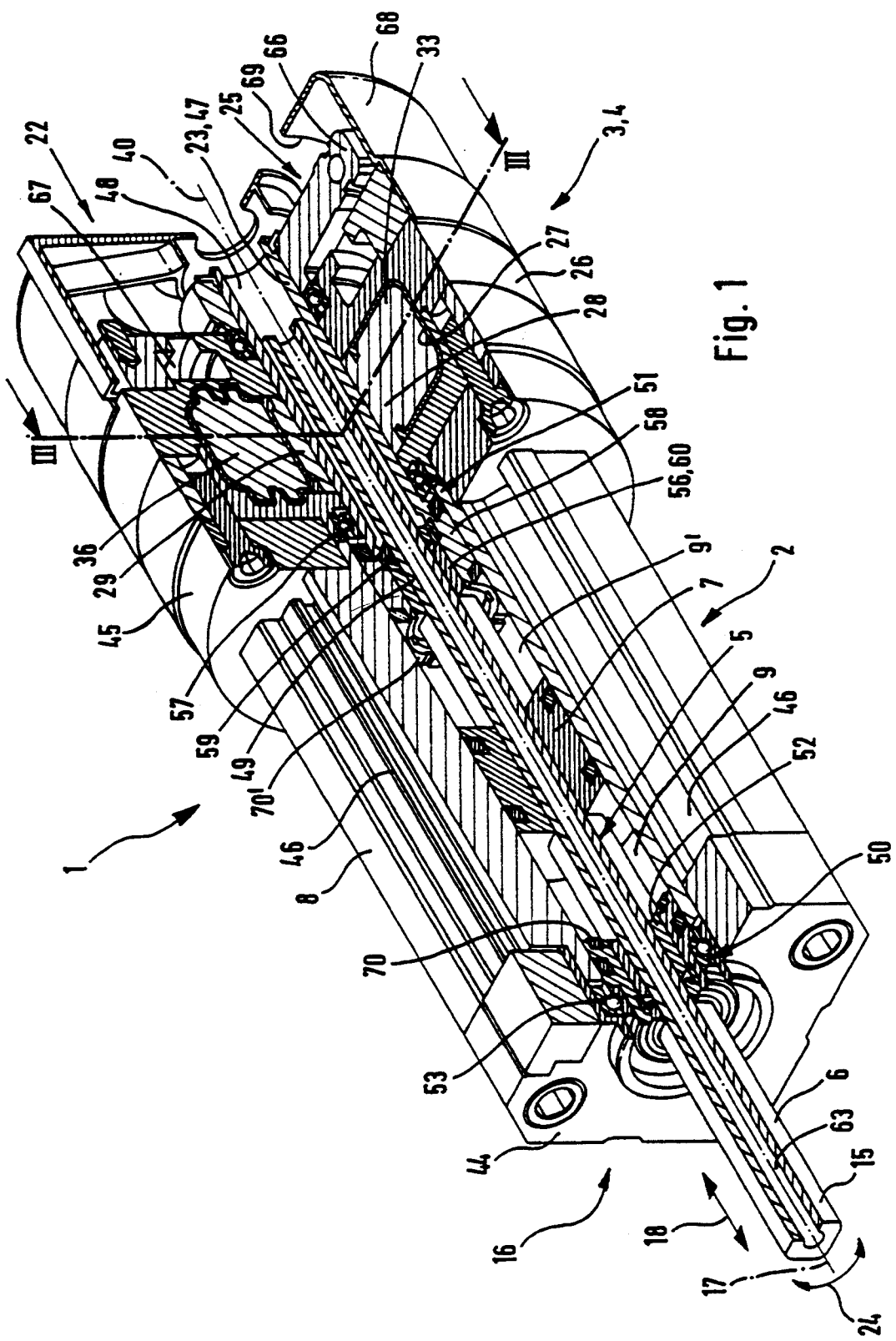
FIG. 1 shows a preferred design of the rotary-linear unit in accordance with the invention in a perspective elevation and with one longitudinal side partly broken away.
Figure 2:
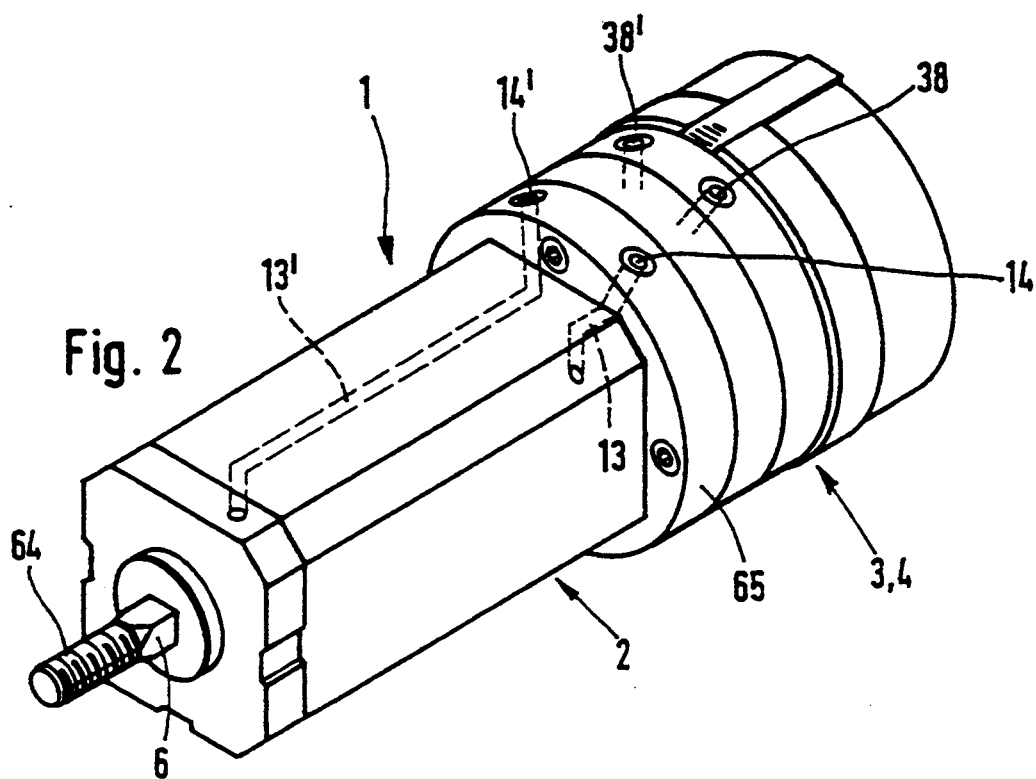
FIG. 2 shows the rotary-linear unit in accordance with FIG. 1 in a simplified representation on a smaller scale, internal power fluid ducts being illustrated in broken lines.

The rotary-linear unit 1 depicted in FIG. 1 has as its main parts a linear drive 2 and a rotary drive 4 constituted by an oscillating vane motor 3. Both drives 2 and 4 are driven by fluid power and more especially by compressed air. The rotary-linear unit 1 possesses an output drive part 5 which essentially consists of a drive rod 6 and a drive piston 7 secured thereon. The latter is arranged for axial sliding motion in the interior of the housing 8 of the linear drive 2, where it separates two housing spaces 9 and 9' from one another, which spaces are in communication via the power fluid ducts 13 and 13' as shown in FIG. 2 (arranged inside the housing) with connecting means 14 and 14' for power fluid lines (not illustrated).

The output drive part 5 has an operative section 15 extending at one end from the housing 8. This part constitutes the front side or end 16 of the rotary-linear unit 1, which could be termed the operative end or side. In an fashion which is not illustrated it is possible for a component to be driven or a device to be moved to be fixedly secured to the operative section 15 and then linearly moved and/or turned.

The longitudinal axis 17 of the output drive part 5 is at the same time the longitudinal axis of the output drive rod 6. Under the action of the linear drive 2 it is possible for the output drive part 5 to be caused to perform a reciprocating stroke movement 18 along its longitudinal axis 17. For this purpose the two housing spaces 9 and 9' are alternately charged with power fluid and, respectively, vented so that the unit composed of the drive piston 7 and the drive rod 6 is moved in the desired direction. It would be possible to also term the linear drive 2 a piston and cylinder unit, the drive rod 6 then constituting the piston rod.

The rotary drive 4 is arranged adjacent to the rear end 22 of the rotary-linear unit 1. On the axial side remote from the operative section 15 it directly adjoins the linear drive, it being permanently flange-mounted thereon. The linear drive 2 and the rotary drive 4 consequently constitute a permanently connected unit similar to a sub-assembly.

The output drive part 5 is connected for the transmission of rotary motion with the oscillating vane motor 3. It is coupled in such a manner as to prevent relative twist with the output drive shaft 23 thereof. Since this output drive shaft 23 is able to be driven to perform a rotary movement about its longitudinal axis, it is consequently also possible for the drive part 5 to be driven to perform an oscillating movement 24 about its longitudinal axis 17. For instance it is possible for it to turn within a range of 272°, the desired angle of oscillation being adjustable within this predetermined range by means of an angular setting adjustment device 25, more particularly steplessly. This angular setting adjustment device 25 is in the present case, for example, a component of the oscillating vane motor 3 and is arranged at the axial end thereof remote from the linear drive 2.

Figure 3:
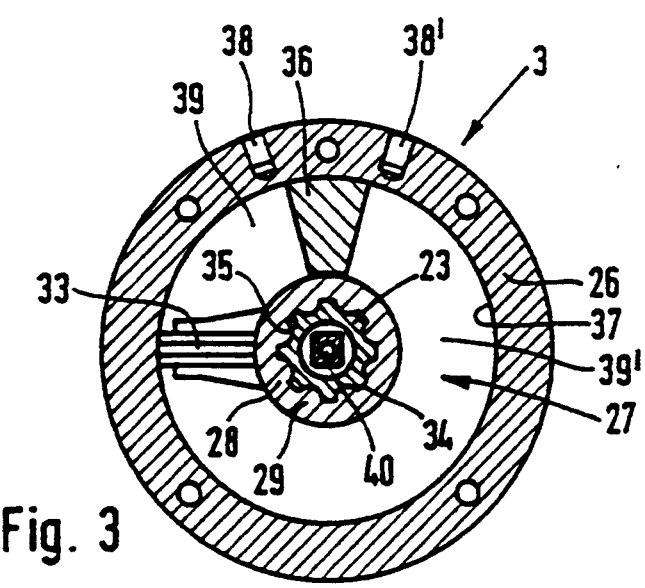
FIG. 3 is a cross section taken through the rotary-linear unit in accordance with FIG. 1 at a position adjacent to the rotary drive as taken on the section line III—III.

As regards the design in the present example of the oscillating vane motor 3 only brief details will be provided here. The basic design is as described in the said German patent publication 3,941,255 A, which is incorporated herein by reference. It will be seen from FIGS. 1 and 3 that there is a housing 26 of the oscillating vane motor 3, which is essentially designed in the form of a tube or hollow cylinder there being a vane chamber 27 in the interior of it. The output drive shaft 23 extends centrally through the housing 26 and has an oscillating vane 28, arranged within the vane chamber 27, mounted on it. Such vane preferably has a bushing portion 29 surrounding the output drive shaft 23, a vane portion 33 projecting radially from the same. The bushing portion 29 is connected with the output drive shaft 23 in such a fashion as to prevent relative twist, for which purpose in accordance with the example the shaft part arranged in the vane chamber 27 has external teeth 34 thereon in order to cooperate with complementary internal teeth 35 of the bushing portion 29. The oscillating vane 28 makes sealing engagement with the limiting surface 37 of the vane chamber 27, said bushing portion 29 furthermore being in sealing cooperation with a partition 36, which is inserted at a point on the periphery in the vane chamber 27, which is circular in cross section. The partition 36, secured to the housing 36, also makes sealing contact with the limiting surface 37.

On the housing 26 two connection means 38 and 38' are provided for external power fluid lines. It is here a question in the example of screw threaded holes, which open into the vane chamber 27 on opposite sides of the partition 36. A respective one of the connection means 38 and 38' communicates in this case with one of the two working chambers 39 and 39' of the oscillating vane motor 3, which are enclosed in the peripheral direction on each side of the vane portion 33 between the same and the partition 36. Using suitable supply and removal means for the power fluid into and out of the working chambers 39 and 39' it is possible for the oscillating vane 28 to be caused to perform a rotary motion about the longitudinal axis 40 of the vane chamber 27 with the result that the output drive shaft 23, coaxial thereto, will execute a corresponding rotary movement. For instance, it is possible to perform rotary movements, which result in a maximum angular displacement of the oscillating vane 28 of approximately 272°.

The housing 8 of the linear drive 2 has a linear extent and at its two ends has terminal walls 44 and 45. The rear terminal wall 45 is for example constituted by the coaxially flange-mounted housing 26 of the oscillating vane motor 3. The opposite terminal wall 44 at the front end 16 is preferably a separately detachable housing cover, as is clearly shown in FIG. 1. Adjacent to the outer periphery of the housing 8 it is possible to provide one or more attachment grooves 46 extending in the longitudinal direction and in which sensors (not illustrated in detail) can be mounted. These sensors are responsive to a permanent magnet device arranged of the output drive piston 7 and are not illustrated either in detail, such response taking place when the magnet device moves past the sensor during motion of the piston. It is in this fashion that signals may be produced in a way dependent on the position of the piston, which are then processed in any desired fashion.

It is preferred for the housing 8 to have an essentially square configuration, there being at least one attachment groove 46 on all four lateral surfaces.

The drive shaft 23 of the oscillating vane motor 3 is, in the example, designed in the form of a hollow shaft 47. It contains an axially extending bearing recess 48 through it, which is open at one end towards the rear end 22 of the rotary-linear unit 1 and at the other end towards the linear drive 2. Adjacent to the linear drive 2 it preferably opens directly into the adjacent housing space 9'.

A rotary drive section 49, opposite axially to the operative section 15 of the output drive part 5, extends from the housing space 9' coaxially into the said bearing recess 48. In the present instance the rotary drive section 49 is the rear end section of the output drive rod 6, which extends through the arrangement, on which the drive piston 7 is preferably crimped. The drive piston 7 may be a single or multi-part piston. The output drive part 5 extends axially through the linear drive 2 and projects to the front and rear out of the housing 8 of the linear drive 2, the front projecting section constituting the operative section 15 and the section projecting at the rear belonging to the rotary drive section 49.

The output drive part 5 is bearinged in the housing on the output drive rod 6 by two bearing means 50 and 51, which are axially spaced apart from one another and it is transversely supported. The one bearing means 50 is arranged in the through opening in the front terminal wall 44. At this position a single or multi-part bearing sleeve 52 is provided, which surrounds the output drive rod 6 coaxially. In this respect the output drive rod 6 is guided in an axially sliding manner in the bearing sleeve 52, the bearing sleeve 52 being a plain bearing-type sleeve if desired. The bearing sleeve 52 itself is bearinged so that it may be turned about its longitudinal axis in relation to the terminal wall 44. For this purpose it is possible to provide an intermediate anti-friction bearing 53.

The second bearing means 51 is arranged adjacent to the output drive shaft 23. On the shaft 23 an axial sleeve-like guiding device 56 is secured, which is more especially set in the bearing recess 48, such guide device 56 coaxially surrounding the rotary drive section 49. Preferably it is here a question of a sliding sleeve of wear-resistant material with good running properties. The output drive shaft 23 is for its part bearinged in a rotatable fashion in relation to the housing parts surrounding it. In the present example an anti-friction bearing device 57 is provided, which is coaxially mounted on the drive shaft 23 and at its other end bears on the housing 26 of the oscillating vane motor 3. Additionally it is possible for the drive shaft 23 to have a centering part 58 thereof extending into the circular outline of the housing space 9'. This is the case in the present example, where the centering section 58 has its outer peripheral surface in sliding contact with the inner periphery surface of the housing space 9' with the result that there is an additional transverse supporting action without impeding rotation. The axial guiding device 56 is preferably accommodated in the centering section 58. This means that the drive shaft 23 is rotationally bearinged in relation to the housing of the rotary-linear unit in the axial guiding device 56.

In order to prevent leakage of power fluid from the housing space 9' via the bearing recess 48, there is in the latter an annular sealing device 59, which without hindering axial motion cooperates in a sealing fashion with the outer surface of the rotary drive section 49.

The axial guiding device 56 in the present case acts additionally as a rotary entraining device 60, which couples the output drive part 5 with the output drive shaft 23 in such a fashion as to prevent relative twist but while allowing for axial sliding motion. For this purpose in the present example the rotary drive section 49 is provided with a non-circular outer form and the inner form of the axial guiding device 56 is shaped in a complementary manner. For this purpose in the example the rotary drive section 49 possesses a square outer configuration and the inner configuration of the axial guiding device 56 is correspondingly shaped. It is particularly simple from the design point of view here to have the geometry employed in the present working embodiment, in the case of which the axially extending output drive rod 6 is all in all designed in the form of a square rod, whose edges may be rounded off if desired. It is in this fashion that at the axial guiding device 56 an interlocking entraining connection for transmission of rotation allowing relative axial motion is provided between the output drive shaft 23 and the output drive rod 6 extending through the axial guiding device 56.

It will be clear that the bearing sleeve 52 of the front bearing means 50 also has an inner periphery which is complementary to the outer periphery of the output drive rod 6 so that an exact guiding action is ensured.

As initially mentioned adjacent to operative section 15 it is possible for the output drive part 5 to be provided, for example with a manipulator or some other instrumentality which is operated by compressed air. In order in this case to be able to do without externally arranged power fluid lines or hoses, it is possible for the drive rod 6 to be provided with a duct-like opening 63 or passageway extending axially from one end to the other. It is then possible for power fluid to be conducted from the rear end 22 to the operative section 15. Furthermore cables or other means necessary the operation of the manipulating device may be laid in the opening 63. In the case of a passage of fluid therethrough the output drive rod 6 will at both ends preferably be provided with suitable terminating means, as for example a screw thread, in the opening or port, with which connection pieces may be secured.

If the output drive part 5 is employed in the described fashion for the conduction of operating fluids, it is best to so design the arrangement that the output drive rod 6 projects at the rear end 22 past the rotary-linear unit 1 (not illustrated) independently of the respective stroke position. In the working embodiment depicted in FIG. 1 the longitudinal dimensions are however such that although the output drive rod 6 cooperates in every possible stroke position with the second bearing means 51, it does however remain within the bearing recess 48 and therefore never projects to the rear in an interfering manner.

In the case of the working embodiment in accordance with FIG. 2 the output drive rod 6 consists of solid material. It will furthermore be seen that there is an attachment device 64 on the operative section 15 for the arrangement thereon of devices which are to be moved.

Apart from the design of the output drive rod 6, the unit illustrated in FIG. 2 is the same as that in accordance with FIG. 1. It is more especially possible to see the connection means 14, 14' and, respectively, 38, 38' for the supply of power fluid to the linear drive 2 and the rotary drive 4, which are collected together at a central position so that they may be extremely simply connected with power fluid lines running to the unit. In accordance with the present example the connection means 14, 14', 38 and 38' are generally arranged in the part between the linear drive 2 and the rotary drive 4. The connection means 14 and 14' of the linear drive 2 are in the present example provided on an intermediate plate 64, which on the one hand is screwed to the housing and on the other hand is screwed to the housing 26. Owing to the central arrangement, which is remote from the actual working zone of the front end 16, of the connection means it is possible to make a change in the connections at any time without any danger.

The linear drive 2 and the oscillating vane motor 3 are able to be operated independently of one another. Because of this it is possible to perform both linear movements and furthermore rotary movements separately from each other, although combined forms of motion are also possible.

On the rear end, remote from the linear drive 2 of the oscillating vane motor 3 there is in the present case also an angular setting adjustment device 25, whose design is preferably the same as that described in the said German patent publication 3,941,255 A1. This offers the advantage that it operates clear of the vane chamber 27 between the housing 26 and the output drive shaft 23 with the result that the oscillating vane 28 is not damaged. In the present case the output drive shaft 23 is extended axially past the housing 26 to the outside and bears an entrained, radially projecting abutment vane 66. In the path of movement thereof one or two abutment elements (not illustrated) are provided, which are adjustably received in an annular holding groove 67 (which is centered of the longitudinal axis 40), of the housing 20, such adjustment being in the peripheral direction. In order to limit the angular displacement the abutment vane 66 strikes against one of the abutment elements. The entire angular setting adjustment device 25 is arranged in a protected fashion underneath a covering cap 68 which is detachably mounted on the housing 26, such cap being provided with at least one access opening 69 through which the abutment elements may be adjusted.

Owing to the arrangement remote from the operative section 15 of the angular setting adjustment device 25 safe adjustment to the respectively desired angle of oscillation is possible.

All in all the invention consequently provides a compact unit assembly with drives which are uncoupled from one another for the linear movement and the rotary movement. For instance the oscillating or respectively rotary movements are transmitted via a square sintered bearing, pressed into the drilled out hollow in the output drive shaft 23, to a square piston rod with a hollow extending therethrough.

On the inner side facing the drive piston 7 both the bearing sleeve 52 as well as the centering section 58 may be provided with a damping ring 70 and 70', which reduces the impact of the drive piston 7 on reaching the terminal position thereof.

We claim:

1. A rotary-linear unit, including a front end having an operative drive section projecting therefrom; the operative drive section comprising an output drive part driven by means of a rotary drive and a liner drive for both a rotary motion about its longitudinal axis and also for a linear stroke motion in the direction of its longitudinal axis, the rotary drive and the linear drive being arranged in sequence along the longitudinal axis of the output drive part, wherein the rotary drive is associated with a rear end of the unit, the linear drive being arranged axially between the rotary drive and the operative section of the output drive part and furthermore the rotary drive is constituted by a fluid power operated oscillating vane motor;

the output drive part extends axially through the linear drive, a rotary drive section of the output drive part is accommodated in a bearing recess of an output drive shaft of the rotary drive section, the rotary drive section with regard to the output drive shaft being locked in the direction of rotation thereof and being able to move in the axial direction;

the linear drive is adapted for fluid power operation and a drive piston is attached to the output drive part within a housing of the linear drive, the drive piston separating a first housing space and a second housing space;

first and second bearing means provided to axially guide and laterally support the output drive part, said first and second bearing means being axially spaced apart from each other and having inner sides facing the drive piston;

the first bearing means being arranged at a front terminal wall of the housing of the linear drive and comprises a bearing sleeve penetrated by the output drive part which is axially slidable therein and being rotatably arranged with respect to the front terminal wall;

the second bearing means comprises a centering part defined by an end section of the rotatable output drive shaft, said centering part extending axially into the second housing space and being in rotatable sliding contact with the inner periphery surface of the housing space.

2. The rotary-linear unit as claimed in claim 1, wherein the output shaft is in the form of a hollow shaft whose bore comprises a bearing recess.

3. The rotary-linear unit as claimed in claim 1, wherein the rotary drive section possesses a non-circular outer periphery and is surrounded by an axial guiding device with a complimentary inner periphery, said axial guiding device being arranged to prevent twist in relation to the output drive shaft while simultaneously functioning for entrainment rotary motion between the output drive shaft and the output drive part.

4. The rotary-linear unit as claimed in claim 3, wherein at least the rotary drive section of the output drive part has a square configuration, the inner form of the axial guiding device being designed to conform thereto.

5. The rotary-linear unit as claimed in claim 2, wherein the output drive part possesses an axially extending output drive rod therein, which at one end constitutes the operative drive section and at the other end constitutes the rotary drive section.

6. The rotary-linear unit as claimed in claim 2, wherein the output drive part possesses a hole extending axially through it, which is accessible from the rear end of the unit.

7. The rotary-linear unit as claimed in claim 3, wherein the output drive shaft of the oscillating vane motor is bearinged for rotary motion externally in relation to the housing of the unit adjacent to the axial guiding device.

8. The rotary-linear unit as claimed in claim 1, comprising connection means on the housing between the linear drive and the oscillating vane motor, which connection means lead via internal ducts to the housing spaces separated by the drive piston and render possible the connection of external power fluid lines.

9. The rotary-linear unit as claimed in claim 8, wherein the power fluid connection means of the linear drive are arranged in the vicinity of power fluid connection means of the oscillating vane motor.

10. The rotary-linear unit as claimed in claim 1, comprising an angular setting adjustment device arranged on the side of the oscillating vane motor remote from the linear drive, such angular setting adjustment device being adapted to operate outside the vane chamber between the housing of the oscillating vane motor and the output drive shaft thereof.

11. The rotary-linear unit as claimed in claim 1, wherein the linear drive and the oscillating vane motor are adapted to be operated separately from one another.

12. The rotary-linear unit as claimed in claim 1, wherein both the bearing sleeve and the centering part are provided with a damping ring, the damping rings being positioned on an inner side of the bearing sleeve and centering part facing the drive position.

13. The rotary-linear unit having a first and second end, and an output drive shaft extending axially through said second end, the rotary-linear unit comprising:
a rotary drive section positioned on said first end of said rotary-linear unit, said rotary drive section including a fluid power operated motor to provide rotary motion to said output drive shaft about a longitudinal axis of said rotary-linear unit;
a linear drive section positioned in a housing on said second end of said rotary-linear unit, said linear drive section including a drive piston operable by fluid power operation to provide a linear motion in the direction of the longitudinal axis to said output drive shaft;
first and second bearing means axially spaced apart and positioned at opposite ends of the linear drive section housing so that inner sides of said first and second bearing means face said drive piston, said first and second bearing means being rotatably arranged in said linear drive section housing to minimized friction braking forces when said drive piston abuts one of said first and second bearing means and the output drive shaft is being drive by said rotary drive section, and wherein said first and second bearing means axially guides and laterally supports said output drive shaft.

14. A rotary-linear unit as claimed in claim 13, wherein said first bearing means comprises a bearing sleeve rotatably arranged on a front terminal wall of the linear drive section housing.

15. A rotary-linear unit as claimed in claim 13, wherein said second bearing means comprises a centering part arranged on an end section of a rotary output drive shaft, said centering part extending axially into the housing of the linear drive section which receives said drive piston and being rotatably arranged therein.

16. A rotary-linear unit as claimed in claim 15, wherein the output drive shaft includes a non-circular outer periphery, the output drive shaft being surrounded by said second bearing means, said second bearing means having an axially guiding device with a complementary inner periphery.

17. The rotary-linear unit as claimed in claim 13, wherein the output drive shaft is circular in cross section and the first and second bearing means includes circularly shaped bearing sleeves whereby the bearing sleeves are rotatably mounted so that upon contact with the drive piston, the bearing sleeves and drive piston rotate at the same speed to minimize frictional braking forces.

* * * * *